United States Patent [19]
Irwin

[11] Patent Number: 5,271,491
[45] Date of Patent: Dec. 21, 1993

[54] BI-DIRECTIONAL SHORT RADIUS TURN CONVEYOR BELT

[76] Inventor: Guy Irwin, 512 Oreland Mill Rd., Oreland, Pa. 19075

[21] Appl. No.: 19,217

[22] Filed: Feb. 18, 1993

[51] Int. Cl.⁵ ............................................. B65G 17/06
[52] U.S. Cl. .................................... 198/778; 198/852
[58] Field of Search ................ 198/778, 831, 850, 852

[56] References Cited

U.S. PATENT DOCUMENTS

| | | | |
|---|---|---|---|
| 3,439,795 | 4/1969 | Roinestad et al. | 198/852 |
| 3,467,239 | 9/1969 | Roinestad | 198/852 |
| 4,078,655 | 3/1978 | Roinestad | 198/778 X |
| 4,742,907 | 5/1988 | Palmaer | 198/852 X |
| 4,846,339 | 7/1989 | Roinestad | 198/852 |
| 4,944,162 | 7/1990 | Lang et al. | 198/852 X |
| 4,951,807 | 8/1990 | Roinestad et al. | 198/778 |
| 5,054,609 | 10/1991 | Poerink | 198/852 |
| 5,139,135 | 8/1992 | Irwin et al. | 198/778 X |
| 5,141,099 | 8/1992 | Baumgartner | 198/778 |
| 5,197,591 | 3/1993 | Roinestad et al. | 198/852 X |

Primary Examiner—James R. Bidwell
Attorney, Agent, or Firm—Thomas R. Morrison

[57] ABSTRACT

A bi-directional short radius turn conveyor belt includes a longitudinal succession of spaced rods transverse to the belt transport course, these rods being interconnected with lines of links, the link lines including outboard such lines at the belt sides and inboard link lines spaced inwardly from the belt sides. The inboard links have a first pitch and the outboard links a larger pitch so that in straight line travel, the links of the inboard lines are tractive and those of the outboard lines non-tractive and partially collapsed. In following a turn course, the links of the inboard line of such remote from the turn side will be tractive and those of the inboard line nearest the turn partially collapsed. In the turn, the links of the outboard link line at the belt outer side or one remote from the turn side will expand and those at of the turn side link line will collapse. Where the turn is one following a spiral or a helical course as in a drive relationship with a drive capstan, the links of the outboard line at the turn side fully collapse as much as possible to insure sustained drive transmission from the capstan to the belt.

19 Claims, 8 Drawing Sheets

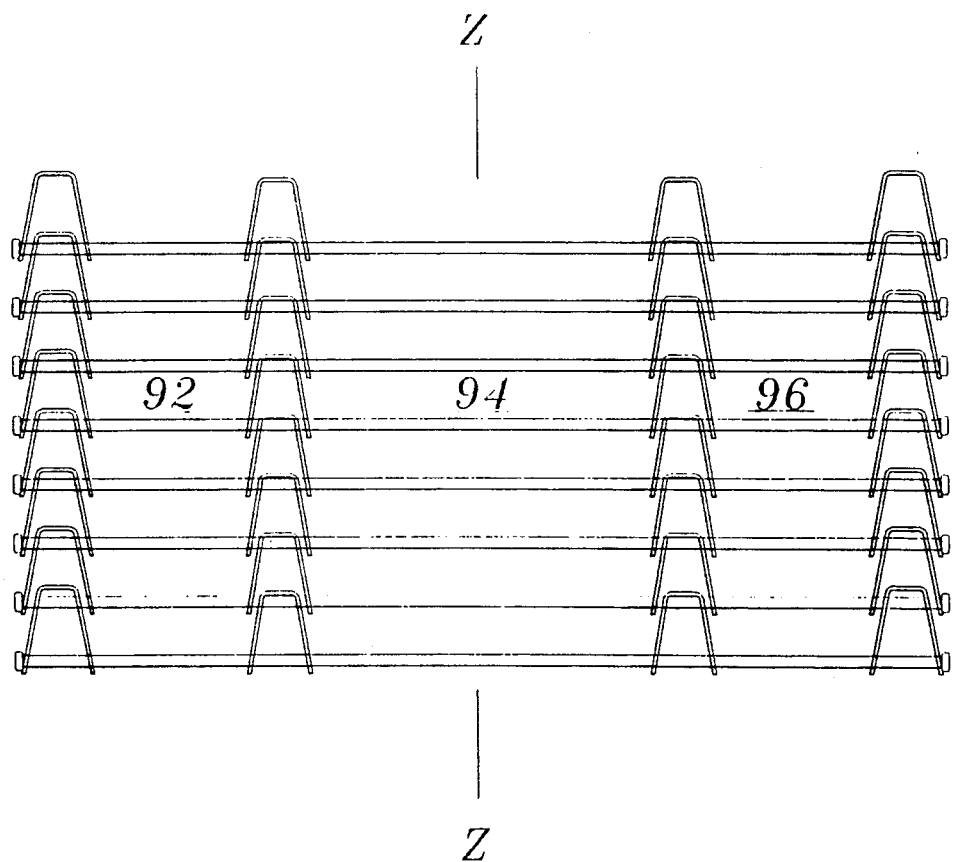

BI-DIRECTIONAL SHORT RADIUS TURN CONVEYOR BELT

BACKGROUND OF THE INVENTION

The present invention relates to a conveyor belt, and more particularly to a conveyor belt for traversing different transport course runs inclusive of straight runs, long and short radius left and right turns, and spiral and helical runs.

In many conveyor belt systems it is required that a long belt transport course be provided in a relatively small space area and for such reason multi-tiered or spiral course conveyors are commonly provided. An example of such use is a bakery operation where baked goods from ovens pass onto spiral conveyors so that a long conveyed travel allows time for goods cooling to take place whereupon goods packaging can follow. To accommodate the conveyor belt following the spiral winding course of a spiral conveyor and for allowing such belt to follow horizontal turn course deviations as well, various constructions of conveyor belts have been developed. These belts will be made of rod and interconnected link elements so that when making a turn, the belt inner edge will undergo a certain condition of foreshortening or collapse, and the belt outer edge will expand or elongate, such collapse or elongation being alteration of belt length at the respective side edges, e.g., from a uniform pitch a belt will have during a straight travel where spacing between successive belt rods will be the same, to lesser or greater pitches at the particular edges.

Because of specifics of these constructions, the radii about which the belt can turn rarely can approach the desirable short turn radius valve of 1.1 times belt width. In other words, the shortest radius most belts can traverse will not be anywhere as low as the desirable value of say, a 22 inch radius turn for a 20 inch wide belt. Many of such constructions are limited in short radius performance by the effect of greatly increased belt tension during turn movement so that attempt to pass the belt into a short radius turn of close to the 1.1 times width dimension can cause belt failure. Further, many belt constructions are suited for turn in one direction only, that is in right or left course deviations. Such single turn direction limitation also precludes turning a belt over to compensate for wear of the upper support face and/or elongation of tractive portions of the belt.

Accordingly, it is desirable to provide an improved belt construction which has bi-directional turn capacity and such as maximizes short radius turn capability.

OBJECTS AND SUMMARY OF THE INVENTION

Accordingly, it is an object of the invention to provide a bi-directional, short radius turn conveyor belt which overcomes the drawbacks of the prior art.

It is a further object of the invention to provide a conveyor belt which can follow conveyor belt transport run deviations laterally of a straight belt run both to the right and left of a straight run, and in a spiral up and/or down runs or in helical winding runs as well, the turns which the belt can transit being any from long radius such to maximum achievable short radius turns of length only slightly larger than the width of the conveyor belt.

It is a still further object of the invention to provide a bi-directional turn conveyor belt which can be turned over after a period of use to compensate for wear occurring at one broad face of the belt and/or elongation of tractive belt portions, so that a previously unused belt face then can be used, thereby prolonging useful belt service life.

Another object is to provide a bi-directional short radius turn belt which can be embodied in both metal and plastic belt constructions.

A yet further object is to provide a bi-directional short radius turn belt which includes rods extending transverse of the belt transport and the rods joined by link lines laterally spaced across the rods, these link lines being comprised of various types of links, with the belt lateral spaces intervening the link lines defining belt sections which optionally can comprise load receptive carrier elements of various description and suited to carriage of particular objects or articles.

Briefly stated, there is provided a bi-directional short radius turn conveyor belt which includes a longitudinal succession of spaced rods transverse to the belt transport course with these rods being interconnected with lines of links. The link lines include outboard such lines at the belt sides and inboard link lines spaced inwardly from the belt sides. The inboard links have a first pitch and the outboard links a larger pitch so that in straight line travel, the links of the inboard lines are tractive and those of the outboard lines non-tractive and partially collapsed. In following a turn course, the links of the inboard line of such remote from the turn side will be tractive and those of the inboard line nearest the turn partially collapsed. In the turn, the links of the outboard link line at the belt outer side or one remote from the turn side, will expand and those at the turn side link line will collapse. Where the turn is one following a spiral or helical winding course as in a drive relationship with a drive capstan, the links of the outboard line at the turn side fully collapse as much as possible to insure sustained drive transmission from the capstan to the belt.

In accordance with these and other objects of the invention, there is provided a conveyor belt movable along a transport course involving course turns deviating rightwardly and/or leftwardly of straight transport course runs and inclusive of spiral coursing turns. The conveyor belt comprises a longitudinal succession of spaced rods arranged in a disposition transversely of the transport course, and longitudinal lines of links interconnecting the succession of rods, each link in a line connecting a rod with a following rod in the succession. Outboard located link lines are at each of opposite lateral extremes of the rods and a pair of inboard located link lines are each respectively spaced inwardly from a respective outboard link line. A belt section between the inboard link lines comprises a belt central section, and belt sections between each inboard link line and a respective outboard link line comprises a belt edge section. The lateral width of the belt central section is greater than the lateral width of either of the belt edge sections. The links in the inboard link lines have a first pitch which is less than that of a second pitch of the outboard link lines so that in a straight course belt travel, the links of the inboard link lines are tractive and the links thereof fully extended with the outboard link lines being non-tractive and the links thereof partially collapsed. During belt movement through a course turn, the links of the outboard link line at one rod lateral extreme collapse to a third pitch, and the links of the link line at the other rod lateral extreme expand to a fourth pitch. In the turn the links of the inboard link line proximal the expanding outboard link line are tractive and at the said first pitch while the links of the inboard link line proximal the collapsing outboard link line partially collapse to a pitch smaller than said first pitch but larger than the said third pitch.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 9 is a fragmentary plan depiction of a belt embodiment wherein the edge sections of the belt have different lateral widths so that the belt structure is asymmetrical of a belt longitudinal axis, the belt being in a straight run inboard link line tractive condition.

DETAILED DESCRIPTION OF THE PREFERRED EMBODIMENT

The conveyor belt of the invention is such as to allow transit of belt conveyor course turns of reduced radii of magnitude not generally achievable with most types of known constructions. Capability of a belt to follow a turn having a radius as small as only 1.1 times belt width without engendering of destructive stress force in the belt during turn movement is significant.

The invention is applicable to belt structures made of a range of materials such as metal, plastic, ceramics, combinations of these and others as well, examples of particular belt material embodiments being given below.

Figure 1:
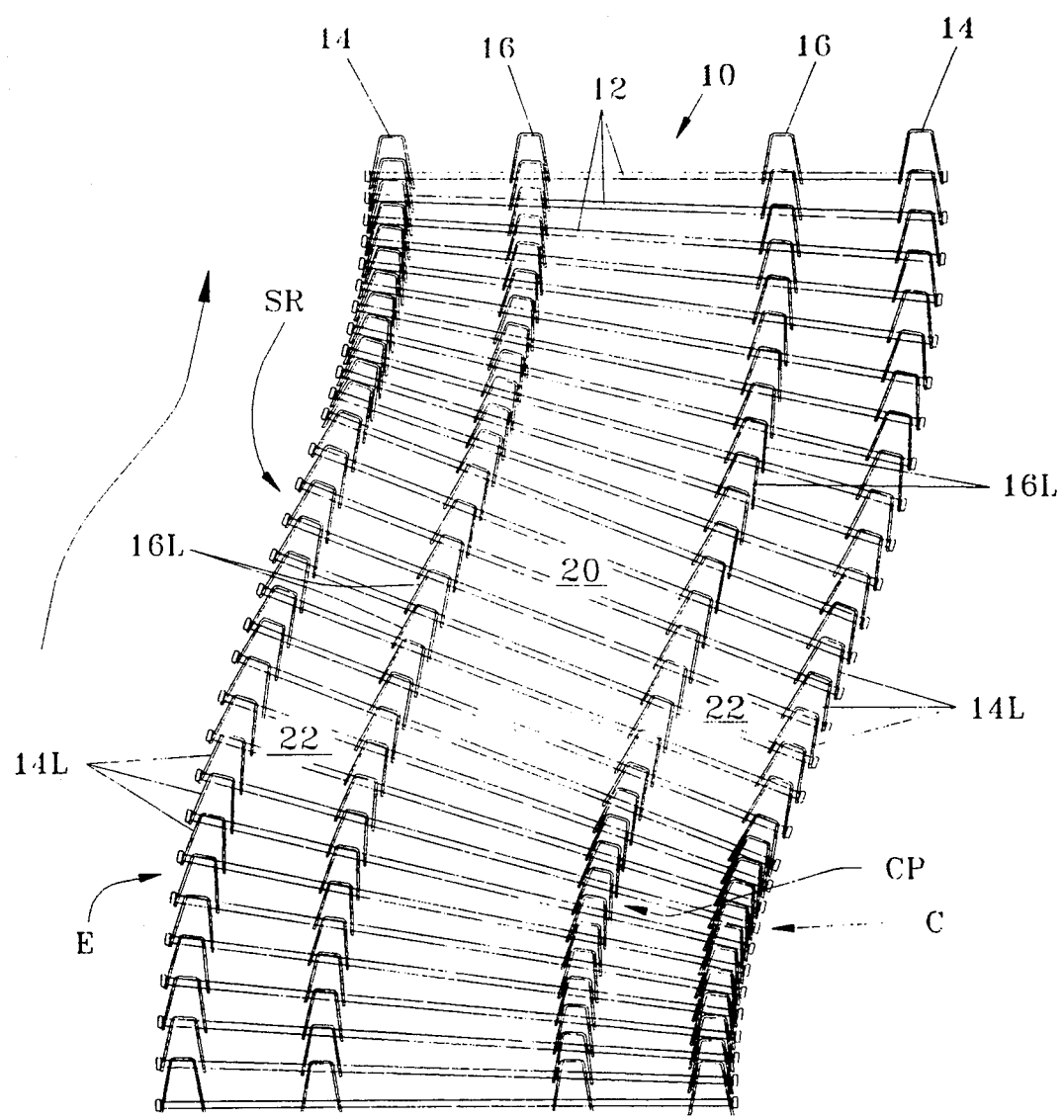
FIG. 1 is a fragmentary plan view of a conveyor belt constructed in accordance with the principles of the present invention, the movement of the belt being in the direction as indicated with an arrow, the belt showing course configuration which changes in the advance shown from a right turn run into a short straight run and then entry into a left turn run, the link lines each being comprised of a succession of links having spaced apart legs joined by a crosshead piece, the belt central section and edge sections presenting load receptive structure defined by the belt rods.

Referring now to FIG. 1, there is shown a first embodiment of a bi-directional, short radius turn conveyor belt 10 which is comprised of a longitudinal succession of spaced rods 12 disposed crosswise or transversely to a belt transport course, the rods being interconnected by a number of link lines these being outboard link lines 14 made up of successive links 14L and inboard link lines 16 made up of successive links 161, the interconnection being such that each rod passes through a given link in each link line and a link next following in the link line.

As is known in the art, the links in the link lines are connected with the rods in such way that links can pivot or hinge on the rods and the rods are slidable or moveable in link slots.

Pass through of the rods in the links is by way of slots and openings formed in the links and as will be discussed below with reference to FIGS. 4A and 4B.

The transport course in which the conveyor belt will move can follow a variety of directional runs from an initial point to a final point such as would correspond to on-load and off-load of products being transported between the two points. The transport course also would have a return run so that in the usual manner the conveyor belt would move in an endless travel. The transport course geometry can include lateral or horizontal turns to the left and right from a straight run and following a turn, resumption of straight run, e.g., as shown in FIG. 1.

Figure 8:
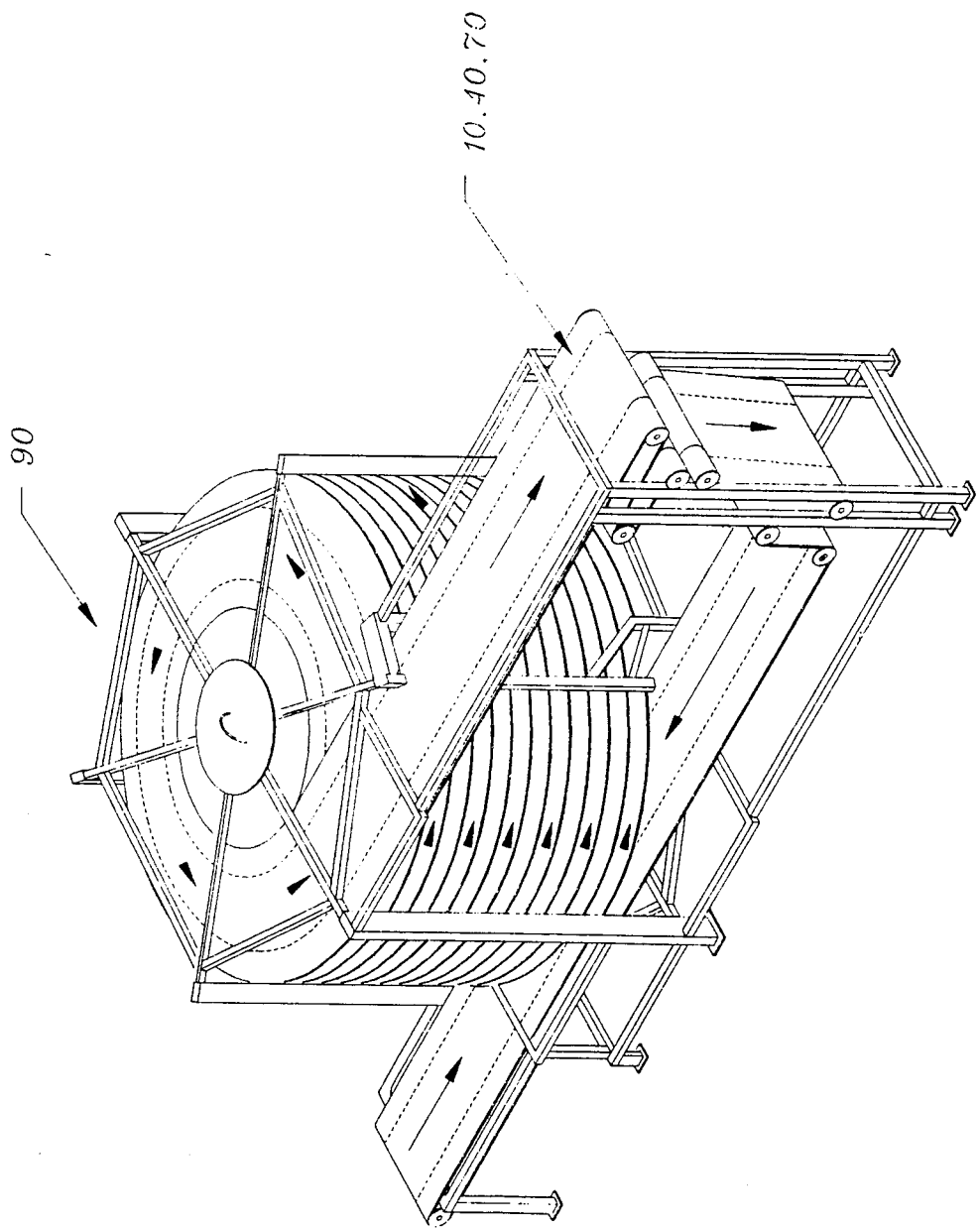
FIG. 8 is a perspective view illustrative of a type of spiral conveyor on which the belt of the invention can be used.

Lateral turns in the transport course can be at radii from smallest (shortest turn) to large radius wherein the turn will be quite shallow, e.g., where a turn need only provide sufficient lateral displacement from a prior straight run to clear an obstrucction such as a narrow pipe following which passage straight run can be resumed. The transport course run also could involve the belt following a spiral run up or down on a drive capstan 90 as shown in FIG. 8.

The arrangement of the link lines on the belt 10 is such that the outboard link lines 14 are at each of the opposite lateral extremes or ends of the rods 12, while the inboard link lines 16 are located inwardly in the belt structure some distance from the sides of the belt. In most applications, the link lines will be symmetrically arranged with respect to the longitudinal centerline or axis of the belt structure. In some instances, the inboard link lines will be asymmetrical of the belt axis in which case though, the lateral turn capability to at least one of the right or left side will be at larger radius than possible with a symmetrical inboard link line arrangement.

In the depicted belt, the expanse thereof demarked by the two inboard link lines comprises a belt central section 20, while that demarked by each inboard link line and adjacent outboard link line, comprises a belt edge section 22.

To provide that the belt can assume necessary collapse at one side and expansion at the other to pass through a short turn radius (which can be as small as 1.1 times belt width), the lateral width of the belt central section 20 will at least be greater than the lateral width of either belt edge section. For smallest turn radius result, the belt center section desirably should be at least equal to the sum of the lateral widths of the two belt edge sections 22 if same are of equal width or at least twice the width of the widest belt edge section if they are not.

In the FIG. 1 belt, the central section can be, e.g., 10 inches wide and the two edge sections each 5 inches wide. In such instance, the total belt width is 20 inches and the shortest turn radius it can transit is 22 inches. Other belt widths can be employed but for short radius turn capability these will be with inboard link line symmetry and as are within the dictate that the center section width be at least equal to twice the width of the widest belt edge section. For example, belt width can be 24 inches with the edge section 6 inches each, and the center section 12 inches.

Figure 4A:
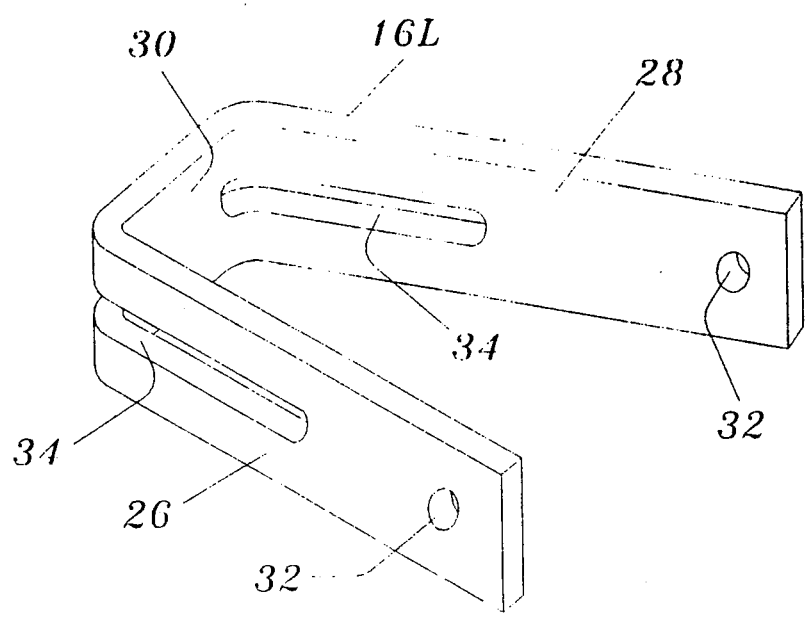
FIG. 4A is a perspective view on enlarged scale of an inboard link line link of the FIG. 1 belt.
Figure 4B:
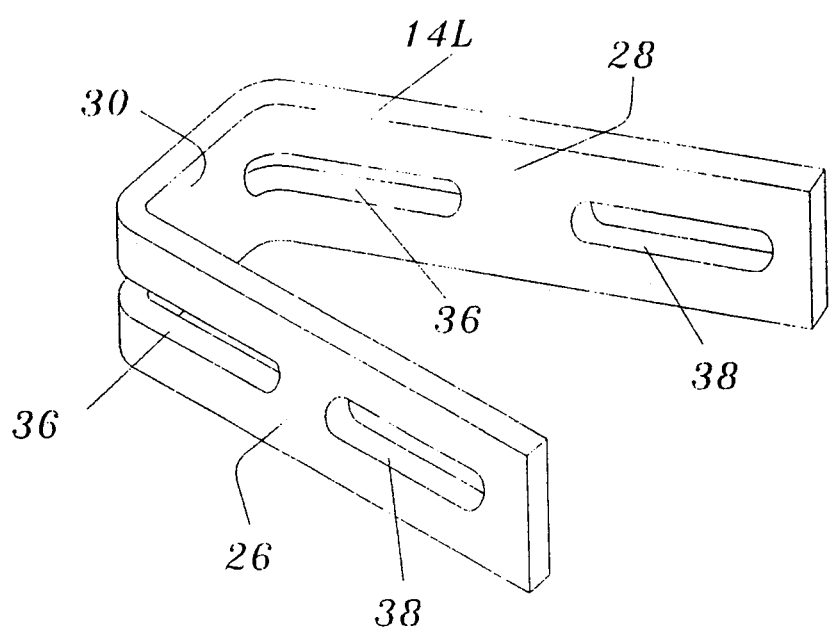
FIG. 4B is a perspective view on enlarged scale of an outboard link line link of the FIG. 1 belt.

FIGS. 4A and 4B show forms of link members which can be used for the respective inboard and outboard link line members 16L and 14L although shapes other than those depicted also could be used. The link members 16l, 14L are of general U-shape having rearwardly directed sides or legs 26, 28 which are joined at the front ends of each by a crosspiece 30, the legs widening or diverging from each other in a direction away from the crosspiece.

The legs 26, 28 of each inboard link 16L are, as seen in FIG. 4A, provided with rod pass through openings, these being in the form of a pair of rear aligned circular openings 32 and a pair of forward aligned slots 34, the slots 34 extending up to the crosspiece 30 so that a rod passing through the slots 34 can when the links 16L are tractive in belt straight run travel, abut the rear face of the crosspiece. From FIG. 4B it will be noted that the legs 26, 28 of each outboard link 14L each have pass through openings in the form of paired forward and rear aligned slotted openings 36, 38.

With reference again to FIG. 1, brief discussion is made of the particulars involved when the belt undergoes bi-directional, short radius turns in course lateral to a straight line travel. The lower portion of the depiction shows the belt moving from a straight run (not shown) into a short radius right turn. In the straight run travel of the belt, the inboard link lines 16 are tractive and fully extended with the links thereof at a first pitch which is less than a second pitch of the links of the outboard link lines 14 so that in such travel these outboard link lines are non tractive and the links thereof are partially collapsed. In following that turn to the right, the links 14L in the link line 14 at the turn side will move together or collapse to a third pitch as indicated by arrow C while the links 14L at the other belt side (i.e., remote from the turn side) will expand to a fourth pitch along the length noted with arrow E. At the same time, the inboard link line 16 remote from the turn side will be tractive at the first pitch and those of the other inboard link line 16 (nearest the turn side) partially collapse as denoted by arrow CP to a pitch less than the first pitch but larger than the third pitch. Least pitch, i.e., the first pitch, will be at the turn side outboard link line where the links in many instances will have full collapse. Achievement of full collapse at the turn side belt edge is particularly to be desired in the case of spiral conveyor belts where forward drive to the belt is imparted by a drive capstan engaging that collapsed side belt edge.

The belt will advance from this right turn to a short straight run SR and then will undergo a short radius left turn wherein the link expansion and collapse, and the pitch parameters are just the reverse of those detailed in the paragraph next above.

Providing belt turn capability in short radius turns as small as only 1.1 times belt width also involves using inboard link line link pitch to outboard link line link pitch ratios of less than one. For example, the FIG. 1 belt has, by way of example, a link pitch ratio based on inboard link pitch of one inch and outboard link pitch of one and one and three sixteenths inch. In another case, the inboard link pitch could be one and three-sixteenths inch while the outboard link pitch would be one and onehalf inch thereby providing less than one ratio.

Realizing smallest turn radius value will also be, in addition to requisite pitch ratio, a function of the belt central section lateral width in comparison to the widths of the belt edge sections. This comparison will be optimized where central section width is at least equal to the sum of the belt edge section lateral widths.

Figure 6:
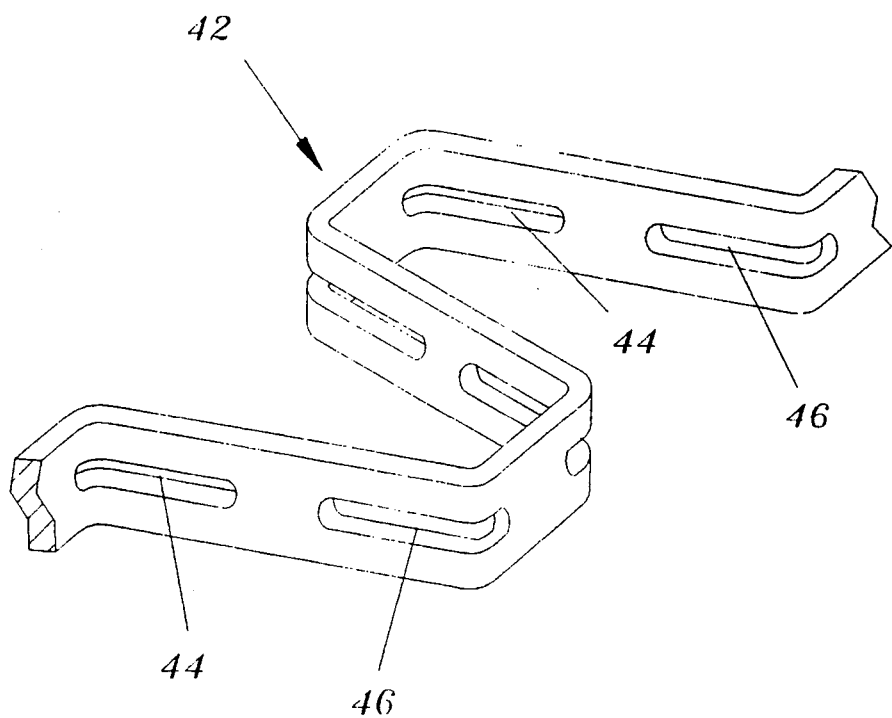
FIG. 6 is a fragmentary perspective view on enlarged scale of one of the flat wire carriers used in the FIG. 2 belt sections.

Referring again to FIG. 1, it will be noted that the rod lengths between the link lines can constitute support surfaces for goods reception where the nature and size of the goods allows for such. In other circumstances, shaped flat wire carriers 42 (FIG. 6) can be provided and mounted on the rods in between the link lines, these carriers being a type known in the art. This type of carrier also is embodied with the FIG. 2 belt described below. FIG. 6 shows the construction of the carriers 42 which present sawtooth profile and are provided with slotted parts as at 44 and 46 (through which pass two successive rods) to accommodate the collapse and expansion of same incident belt turn travel.

Figure 2:
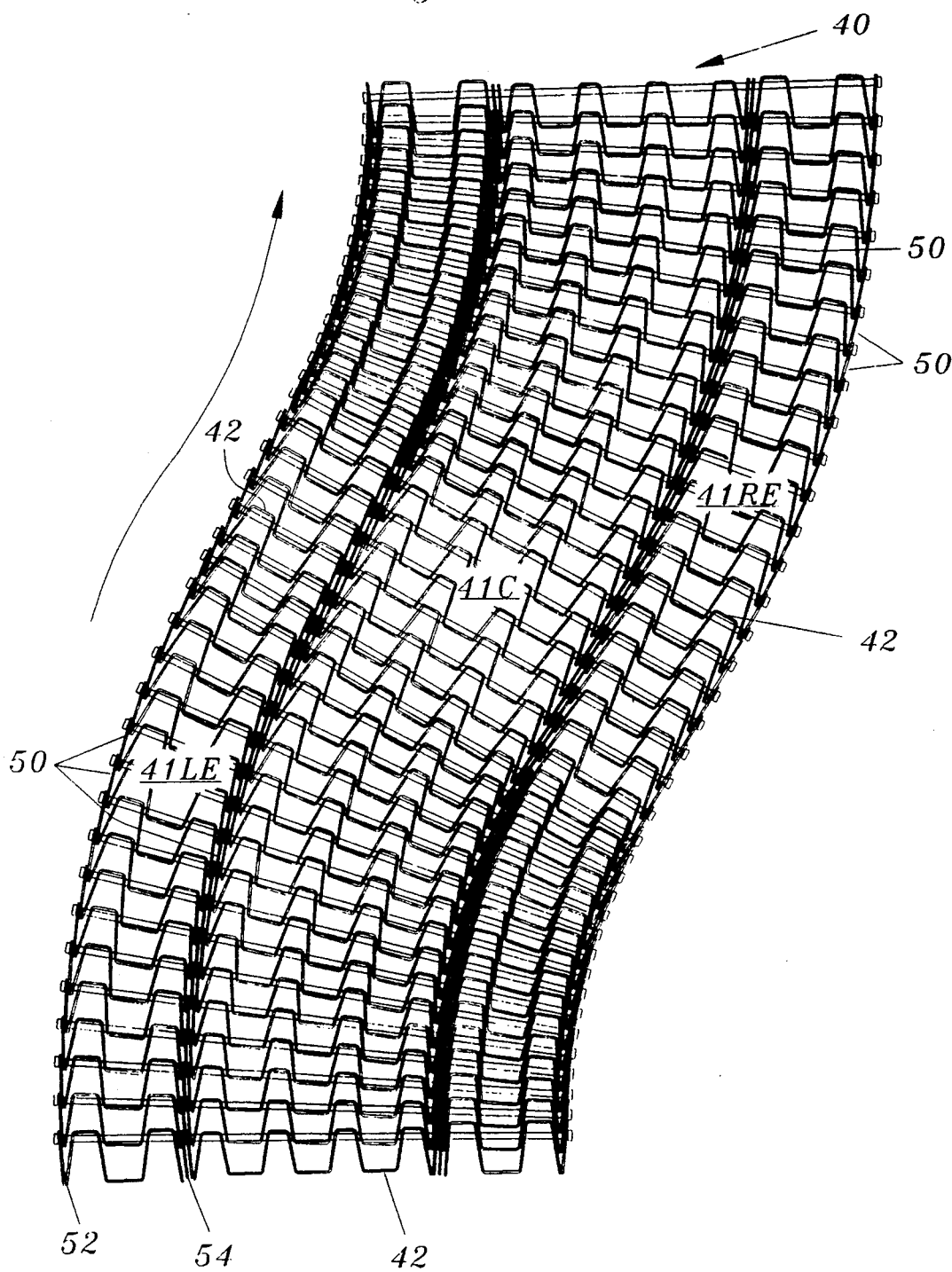
FIG. 2 is a view similar to FIG. 1 except that each link in the respective link lines is comprised of one or more link bars, there being shaped flat wire carriers connected one to a succeeding such carrier mounted on each rod, these carriers constituting load receptive central belt section and edge section elements.

The belt 40 shown in FIG. 2 uses link bars 50 instead of U-shaped links in the belt link lines. The link bar may comprise a link line of single such link bars 50 as used in the belt 40 outboard link lines 52, or same may be stacked in side-by-side relation of two or more link bars 50 to comprise an individual link unit in a link line. The inboard link lines 54 use paired or stacked bar units. Flat wire carriers 42 extend across the belt between the respective belt sections 41LE, 41C and 41RE, the link lines of belt 40 being symmetrically arranged with respect to the belt axis.

Figure 5A:
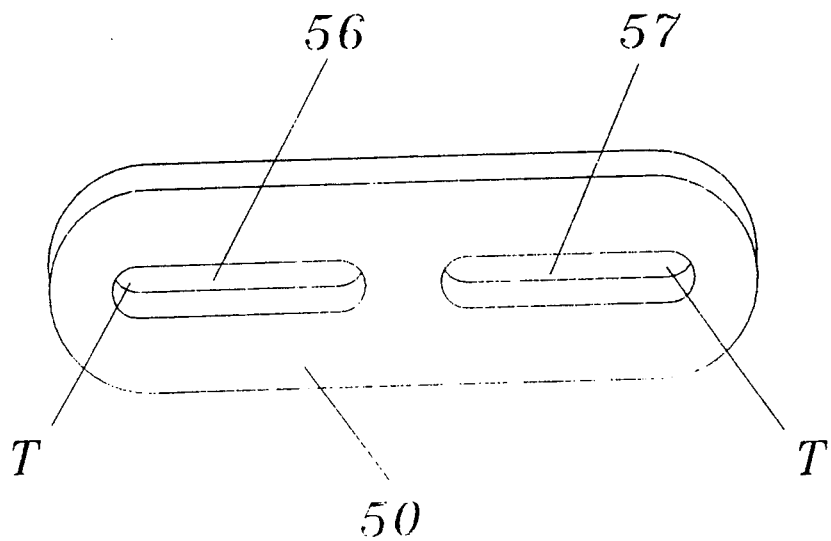
FIG. 5A is an enlarged scale perspective view of an inboard link line link bar of the type used in the FIGS. 2 and 3 belts.

As seen in FIG. 5A, the link bars used in the inboard link line link units will be slotted as at 56 and 57 to accommodate pass through of successive rods. With the inboard link lines tractive in straight run, successive rods passing through each link bar will locate in slots 56, 57 at the respective locations T therein, the rods being then separated a "first pitch" distance.

Figure 5B:
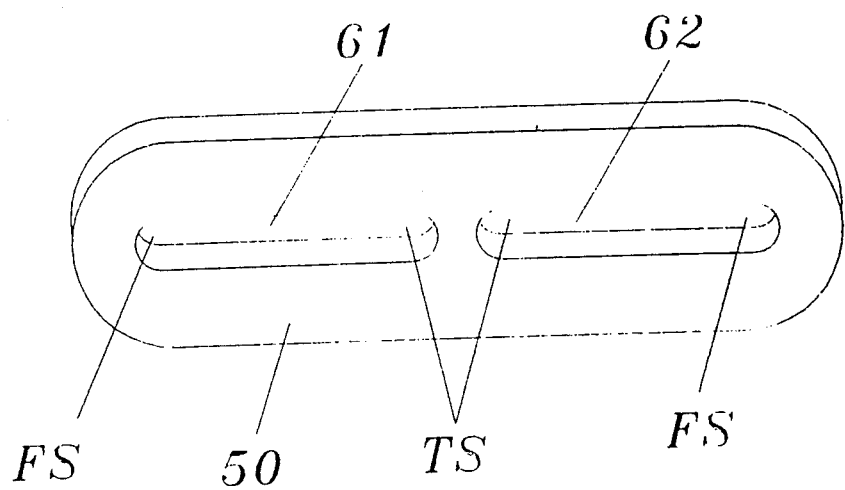
FIG. 5B is an enlarged scale perspective view of an outboard link line link bar of the type used in the FIGS. 2 and 3 belts.

The link bars 50 shown in FIG. 5B and used in the outboard link lines are somewhat longer than those used in the inboard link lines and also are provided with slots 61, 62. The slots 61, 62 are longer than the slots 56, 57 and the proximal slot ends in each such link bar are closer than in the link bars of the inboard link lines. This is to allow rod movement to the greater degree involved in the expansion and collapsing of the belt side edges in coursing turns.

During a turn, the rods locate at locations TS in the outboard link line links at the turn side, the rod spacing being at a "third pitch". The rods at the belt side remote from the turn on the other hand, locate at the locations FS, the rods being separated a distance of a "fourth pitch".

Figure 7:
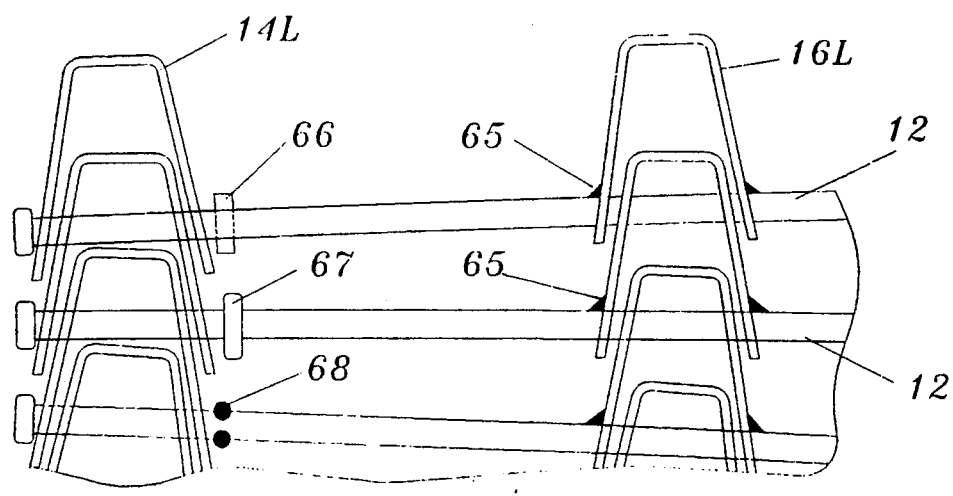
FIG. 7 is a fragmentary plan showing of one form of lateral limiting movement means which can be carried on the belt rods to limit lateral relative movement between a rod and a link member connected therewith, the showing being at much enlarged scale for clarity of depiction.

As the belt transits lateral turns, there could be tendency for the links of the link lines to laterally displace along the rods and particularly in respect of the FIG. 1 belt and especially so as to the outboard link line links. The FIG. 1 inboard link lines do not present any special problem in this regard because the links 16L are as shown in FIG. 7, fixed as by weldments 65 to the rods 12, this being done to insure no displacement of such links laterally slidably or rotatably on the rods because these links are engageable with forward belt drive means (not shown).

To counter such possibility, stop elements can be provided on the rods in various forms. These will generally be provided at each lateral side of inboard link line links where bar links are used as in the FIGS. 2 and 3 belts, and at the inboard side of the outboard link line links of all depicted belts. The stops elements as illustrated in FIG. 7, can be provided as pins 66 fixed in the rods, as stop washers 67, e.g., press fitted to the rods or even as weldments 68 as long as same are effectively sized larger than openings or slots in the links.

The belt of the invention can be of different materials depending on the application involved. Thus for heavy duty conveying service, metal construction will be used. In other applications such as is illustrated in FIG. 3, plastic or ceramic might be used.

Figure 3:
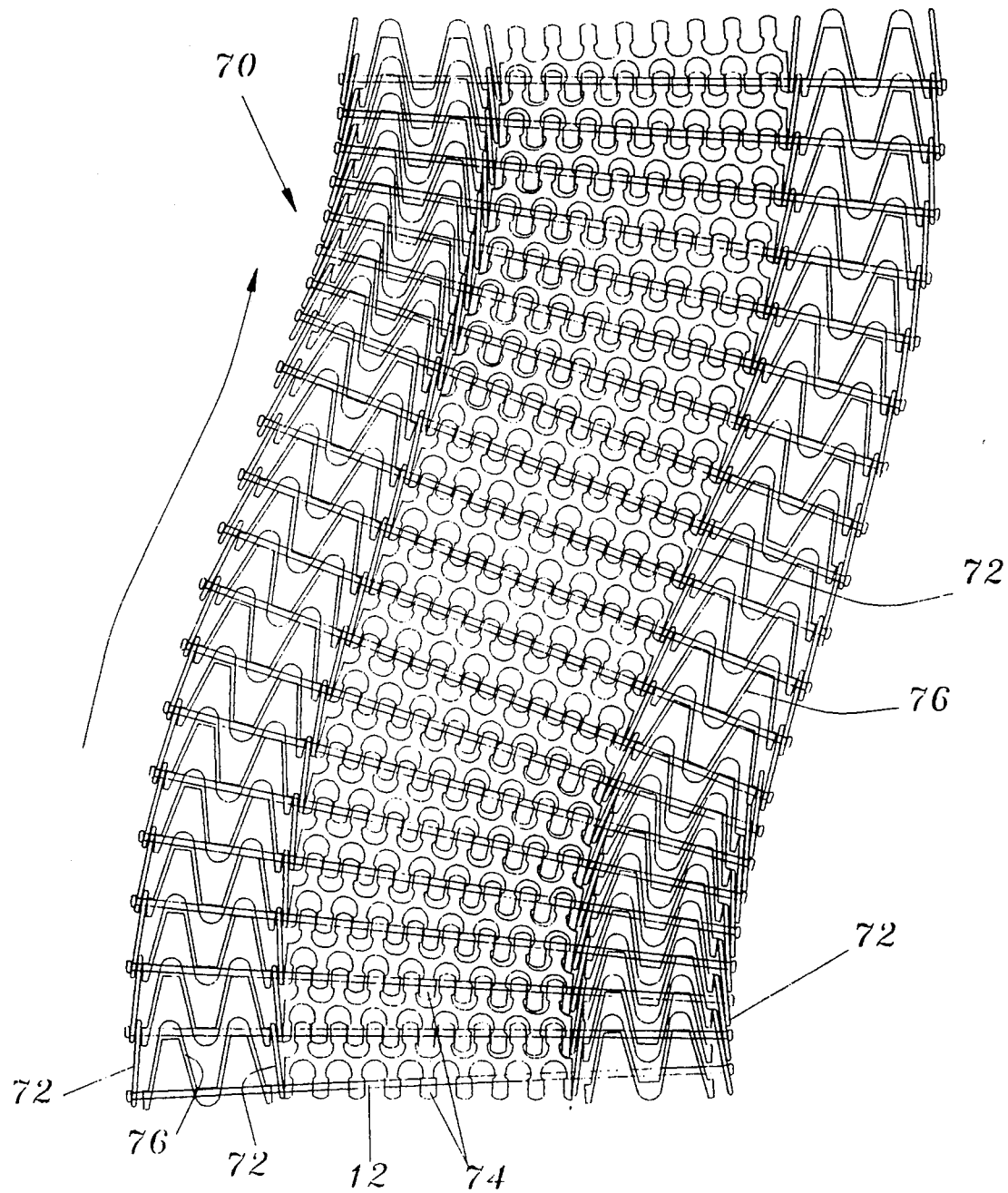
FIG. 3 is a view similar to FIG. 1 depicting a plastic conveyor belt having link bar link lines with interconnected plastic modules comprising the belt central section, the belt edge sections comprising interconnected sinuous profile plastic carriers.

The FIG. 3 belt 70 which has symmetrically arranged link lines, uses plastic link bars 72 and plastic modules 74 of a type like or similar to that disclosed in U.S. Pat. No. 5,139,135, the modules which are load supporting elements define the belt central section between the two inboard link lines. The rods 12 of the belt 70 could in some instances be plastic or synthetic material but where strength is a prime requirement they will be metal and in some instances plastic or like material coated metal. The belt edge sections between each inboard and outboard link line also have load support members or carriers 76 which can be, for example, of the sinuous plan profile depicted and these can be molded plastic elements.

The invention allows for some disparity in lateral belt edge section widths and as is seen from FIG. 9, while at the same time permitting small radius lateral turning therewith at least in one direction. The belt 90 shown in FIG. 9 can have a left belt edge section 92 width of 4 inches, a central section 94 width of 12 inches and a right edge section 96 width of 6 inches, the inboard link lines being asymmetrical of the belt central axis Z—Z. Turns in the left lateral direction will be at short radius, but turns to the right due to the asymmetrical arrangement in the belt, will only be relatively shallow in comparison.

A FIG. 9 type belt where respective left edge section, central section and right edge sections are of 3, 12 and 9 inches, respectively, will have somewhat good left turn short radius capability but right turn radius will be quite restricted even more than in the belt of the paragraph next above because of the greater proportional size disparity between the right and left edge section widths involved.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A conveyor belt movable along a transport course involving course turns deviating rightwardly and/or leftwardly of straight transport course runs and which transport course can include course runs which follow spiraling upward and/or downward travel paths, the conveyor belt comprising a longitudinal succession of spaced rods arranged in a disposition transversely of the transport course, and longitudinal lines of links interconnecting the succession of rods, each link in a line connecting a rod with a following rod in the succession, there being outboard located link lines at each of opposite lateral extremes of the rods and a pair of inboard located link lines each respectively spaced inwardly from a respective outboard link line, a belt section between the inboard link lines comprising a belt central section, belt sections between each inboard link line and a respective outboard link line comprising a belt edge section, the lateral width of the belt central section being greater than the lateral width of either of the belt edge sections, links in the inboard link lines having a first pitch which is less than that of a second link pitch in the outboard link lines so that in a straight course belt travel, the links of the inboard link lines are tractive and the links thereof fully extended with the outboard link lines being non-tractive and the links thereof partially collapsed, during belt movement through a course turn, the links of the outboard link line at one rod lateral extreme collapsing to a third pitch and the links of the link line at the other rod lateral extreme expanding to a fourth pitch, the links of the inboard link line proximal the expanding outboard link line being tractive and at the said first pitch, the links of the inboard link line proximal the collapsing outboard link line partially collapsing to a pitch which is smaller than said first pitch but larger than said third pitch.

2. A conveyor belt in accordance with claim 1 in which the belt central section lateral width is at least equal to the sum of the widths of the belt edge sections.

3. A conveyor belt in accordance with claim 1 in which the belt central section lateral width is at least twice the width of that of the widest belt edge section.

4. A conveyor belt in accordance with claim 1 in which the belt edge sections are of substantially equal lateral widths.

5. A conveyor belt in accordance with claim 1 comprising means carried on the rods for limiting lateral relative movement between said rod and any link line links carried thereon.

6. A conveyor belt in accordance with claim 5 in which the means for limiting lateral relative movement is carried on the rods at locations adjacent inboard sides of the links in the outboard link lines.

7. A conveyor belt in accordance with claim 5 in which the rod lateral limiting movement means is carried on the rods at locations adjacent opposite sides of each inboard link line link.

8. A conveyor belt in accordance with claim 5 in which the means for limiting lateral relative movement comprises stop elements carried on the rods adjacent locations thereon where inboard link line links have connection therewith, the stop elements having size larger than any rod pass through openings present in a link.

9. A conveyor belt in accordance with claim 8 in which the stop elements are one of pins, washers or weldments carried on the rods.

10. A conveyor belt in accordance with claim 1 in which the belt central section and the belt edge sections present load receptive structure comprising load supporting elements in each section.

11. A conveyor belt in accordance with claim 10 in which the rods pass through the load supporting elements.

12. A conveyor belt in accordance with claim 11 in which the inboard and outboard link line links are metal and the load supporting elements are flat wire carriers.

13. A conveyor belt in accordance with claim 11 in which the belt central section load supporting elements are plastic modules, the belt edge section supporting elements comprising sinuous plan profile carriers.

14. A conveyor belt in accordance with claim 1 in which the ratio of the pitch of the links in the inboard link lines to that of links in the outboard link lines is less than one.

15. A conveyor belt in accordance with claim 14 in which the inboard link line link pitch to outboard link line link pitch ratio is 1 to 1.1875.

16. A conveyor belt in accordance with claim 1 in which the links in the link lines comprise U-shaped links having divergent legs joined at an end of each by a cross piece.

17. A conveyor belt in accordance with claim 1 in which the links in the link lines comprise bars.

18. A conveyor in accordance with claim 1 in which the links in each link line each comprise a link unit of at least two side-by-side stacked such links.

19. A conveyor belt in accordance with claim 1 in which the inboard link line pitch to outboard link line pitch ratio, and lateral width size of the belt central section in comparison to the sum of the lateral widths of the belt edge sections is such that the belt can follow a transport course lateral turn run having a turn radius as small as about 1.1 times the belt with.

* * * * *